United States Patent [19]

Wood et al.

[11] 4,335,608

[45] Jun. 22, 1982

[54] SUBMERSIBLE PRESSURE TRANSDUCER DEVICE

[76] Inventors: Russell J. Wood, Bailey Rd., Lanesboro, Mass. 01201; Ivan J. Garshelis, 500 Pittsfield Rd., Lenox, Mass. 01240

[21] Appl. No.: 161,756

[22] Filed: Jun. 23, 1980

[51] Int. Cl.³ ............................................. G01F 23/18
[52] U.S. Cl. .................................................... 73/301
[58] Field of Search ............ 73/301, 722, 728, DIG. 2

[56] References Cited

U.S. PATENT DOCUMENTS

| | | | |
|---|---|---|---|
| 2,376,156 | 2/1944 | Kuehni | 73/DIG. 2 |
| 2,718,145 | 9/1955 | Nisle | 73/301 |
| 4,226,126 | 10/1980 | Herden | 73/722 |
| 4,227,410 | 10/1980 | Ruben et al. | 73/301 |

Primary Examiner—Donald O. Woodiel

[57] ABSTRACT

A completely submersible pressure-sensing transducer contains an air vent tube for providing a pressure differential relationship between the hydrostatic head and the atmosphere. The transducer contains associated electronic circuitry for providing direct read-out and absolute units.

19 Claims, 5 Drawing Figures

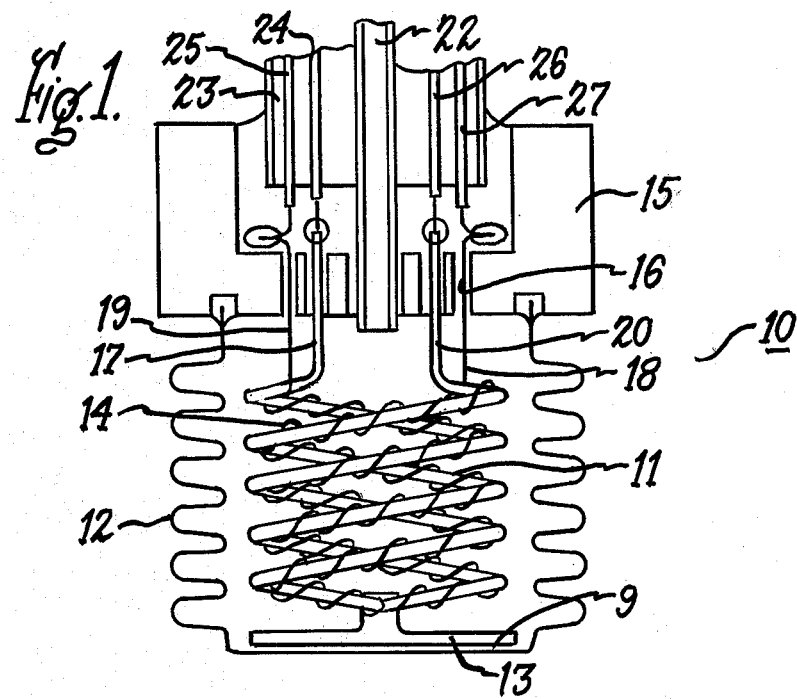
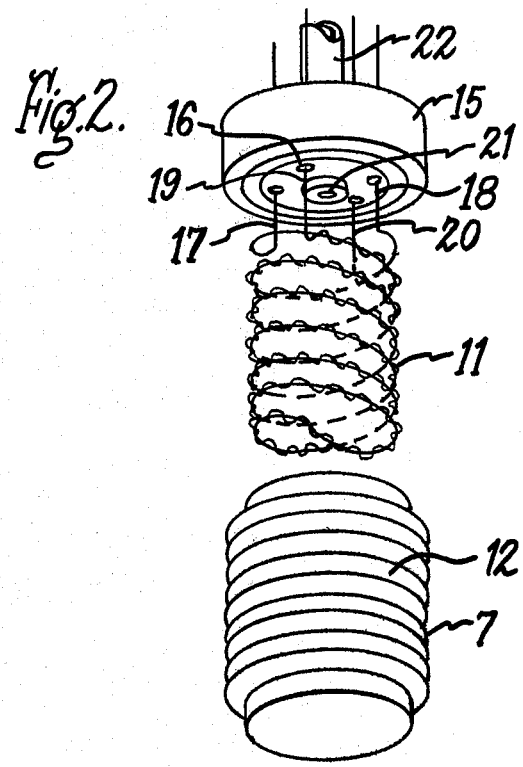

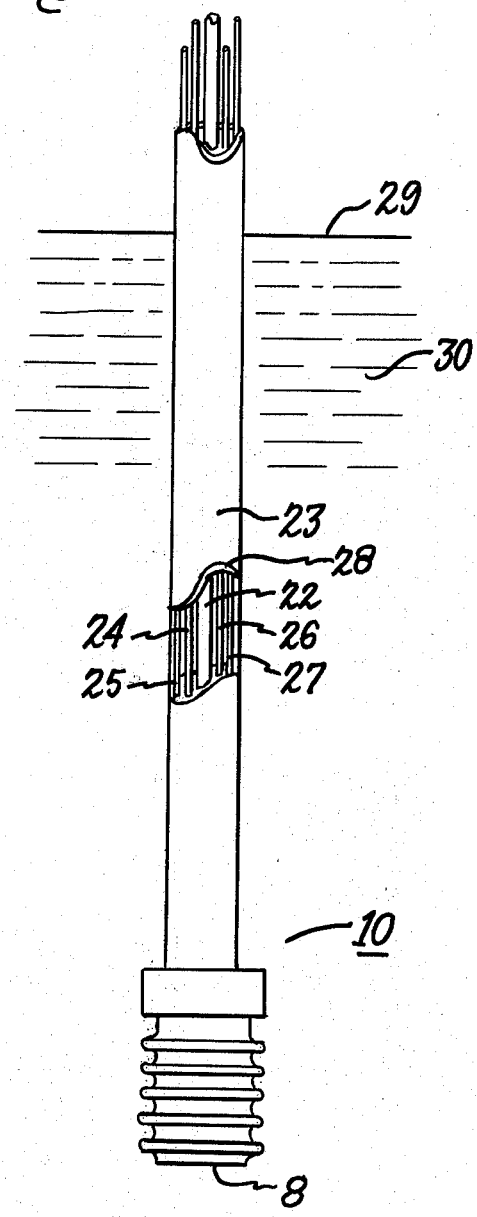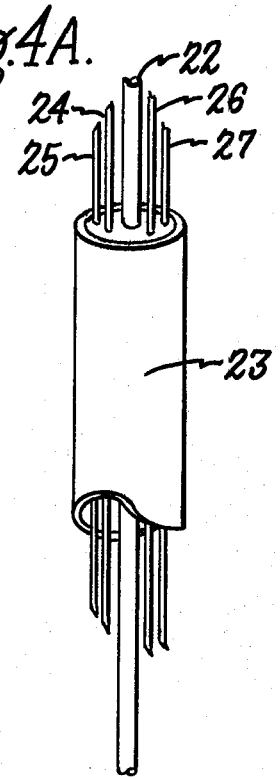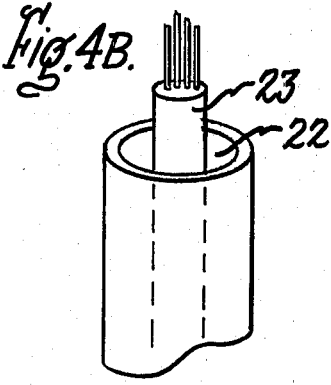

SUBMERSIBLE PRESSURE TRANSDUCER DEVICE

BACKGROUND OF THE INVENTION

Means currently for measuring hydrostatic pressure for liquid level applications generally comprise a differential pressure device mounted at the surface of the body of liquid to be measured wherein one portion of the sensing element is vented to the immediate atmosphere and wherein a pressure equivalent to the hydrostatic head is applied to the opposite side of the sensing device to establish the differential. When the aforementioned device is used to monitor the level of a deep well, for example, an air pressure line must be introduced below the lowest level of the well to be sensed. An air pressure source must be relied upon to displace the water from the sensing pipe.

Another sensing device employs an hermetically sealed transducer wherein one reference is provided by a vacuum and the pressure is directly sensed below the surface of the liquid involved. Because of the vacuum containment, the housing must be specially constructed in order to avoid any leaks or damage to the pressure-sensing means within the housing. When the vacuum-sealed units are used in liquids of varying depths, the pressure differential readings will be altered by changes in atmospheric conditions above the level of the surface of the liquid being measured.

The purpose of this invention is to provide a liquid level sensor for complete submersion below the level of the liquid being sensed without relying upon a vacuum-sealed device or relying upon an auxiliary source of compressed air or gas. The sensor of the instant invention does not require auxiliary means for compensating for changes in the atmospheric pressure above the surface of the liquid.

SUMMARY OF THE INVENTION

The invention comprises a completely submersible sensing mechanism containing an air vent supply for maintaining a pressure differential between the atmospheric pressure above the liquid level and the hydrostatic head of the liquid being sensed. The invention further comprises a novel combination of an electric supply cable which houses the air vent and supplies the atmospheric pressure as well as the electric power necessary for electrical read-out through auxiliary surface equipment.

BRIEF DESCRIPTION OF THE DRAWINGS

FIG. 1 is a cross-sectional view of one pressure transducer for use within the instant invention;

FIG. 2 is a front perspective view, in isometric projection of the pressure transducer of FIG. 1;

FIG. 3 is a diagrammatic representation of the embodiment of FIG. 1 within a water well; and FIGS. 4A and 4B are top perspective views of the vented cable used within the embodiment of FIG. 3.

DESCRIPTION OF THE PREFERRED EMBODIMENT

FIG. 1 shows a pressure transducer 10 containing a displacement element 11 of the type described, for example, within U.S. patent application Ser. No. 937,821 (Garshelis) filed Aug. 29, 1978 and entitled "Electromechanical Transducer and Limits Switch Therefor", which application is incorporated herein for purposes of references. Surrounding displacement element 11 is an expandable bellows 12 held in cooperative relationship with element 11 by means of a plate 13. Upon response to pressure on the outside surface of bellows 12, plate 13 transmits said pressure variations to displacement element 11 and a corresponding electrical signal is generated in solenoidal winding 14. A mounting base 15 is provided for supporting bellows 12 and providing apertures 16 through which electrical contact lead 17 connects with one side of displacement element 11 and electrical contact 18 connects with the other side of displacement element 11. Contact leads 19 and 20 electrically connect with solenoid winding 14 and aperture 21 provides for the passage of an air vent tube 22, the purpose of which will be described below in greater detail. Electrical contacts 17-20 and vent tube 22 are contained within cable 23. The 1 and composition of plate 13 is selected to compensate for the differences in thermal expansion between displacement element 11 and bellows 12. For the embodiment depicted in FIG. 1, plate 13 consists of aluminum and bellows 12 consists of a phosphor bronze alloy. Displacement element typically consists of a 70% nickel and 30% iron alloy which is characteristic for magnetostrictive devices.

An important feature of this invention lies in the relationship between vent tube 22 and displacement element 11, and bellows 12. Vent tube 22 always remains in direct contact with the atmosphere above the surface of the liquid to be sensed in order to provide atmospheric pressure to the inside portion 9 of bellows 12. The pressure exerted by the fluid being sensed on the exterior surface 8 of bellows 12 is sensed by means of displacement element 11 relative to the effects of atmospheric pressure present on the inside portion 9 of bellows 12. This feature, therefore, immediately compensates for changes in the atmospheric pressure above the surface of the liquid being sensed and allows pressure transducer 10 to be located at any level below the surface.

FIG. 2 shows the pressure transducer 10 of FIG. 1 in greater detail. Here the displacement element 11 is in the form of a double helix configuration in order to insure that electrical connecters 18 and 19 are at the same end of displacement element 11 for insertion through base 15 by means of apertures 16 in the manner described earlier. Bellows 12 comprises a flexible metal having a plurality of convolutions 7 in order to provide for the linear displacement of bellows 12. It is to be noted that bellows 12 can have a flexible membrane at its planar surface in lieu of convolutions 7. Vent tube 22 shown inserted within vent tube aperture 21 can be fixedly attached to base 15 in order to prevent any of the liquid from entering to within bellows 12 interfering in any manner with displacement element 11. When pressure transducer 10 is completely assembled, an apoxy-sealing agent is applied to apertures 16 and to the point of passage between 22 and 21 in order to insure that no liquid enters within pressure transducer 10.

The operation of pressure transducer 10 can be seen by now referring to FIG. 3 wherein cable 23 extends below the surface 29 of a liquid 30 such as, for example, the water in a well and wherein pressure transducer 10 is located beneath the surface 29. The pressure of liquid 30 exerted on the outside 8 of pressure transducer 10 is a function of the distance below the surface of liquid surface 29 as well as the atmospheric pressure above surface 29. This is an important feature of the instant invention and as described earlier, compensates for variation in atmospheric pressure by allowing the atmospheric pressure to transfer through vent tube 22 to the inside of pressure transducer 10 as described earlier. In order to provide good electrical insulation and water-sealing properties to cable 23, a jacket 28 can be manufactured from a flexible insulating material such as high-density polyethylene. Vent tube 22 can consist of a rubber, plastic, or metal but for the embodiment of FIG. 3 a polyethylene tube is preferred. Electrical leads 24 and 25 are individually insulated from each other and are shown for purposes of example, since four electrical contacts are usually employed as described earlier. Electrical connection with related power sources and electronic metering devices of the type well-known in liquid-level sensing is made by means of contacts 24 and 25, for example, extending from the end of cable 23. It is to be understood that electrical circuit elements can also be included in transducer 10 in order to more efficiently utilize the circuit relationship between auxiliary related equipment and pressure transducer 10.

Although magnetostrictive-sensing elements such as displacement element 11 in FIG. 1 is described for sensing the hydrostatic pressure on pressure transducer 10, it is to be understood that other types of displacement sensing elements such as piezoelectric transducers, for example, can also be employed.

FIG. 4A shows cable 23 wherein vent tube 22 is surrounded by contact leads 24–27 which connect with electrical connectors 17–20. Another arrangement for cable 23 is shown in FIG. 4B wherein a vent tube 22 is provided external to electrical cable 23 which houses electrical contact leads 24–27. Atmospheric pressure is provided by means of vent tube 22 in this embodiment.

Although the invention is described for sensing the liquid level of a deep-water well, this is by way of example only. The pressure-sensing transducer of this invention can be used in determining the level of any type liquid whatsoever.

We claim:

1. A pressure transducer for determining the level of liquids comprising:
   a sensing element responsive to variations in hydrostatic pressure:
   air vent means for providing atmospheric pressure to one side of said sensing element;
   a water-tight housing for containing said sensing element and for receiving said air vent means, said housing being at atmospheric pressure when submerged below a liquid; and
   a plate between a portion of said housing and said sensing element for compensating for the differential and thermal expansion between said sensing element and said housing.

2. The pressure transducer of claim 1 further including a mounting base at one end of said housing for supporting a plurality of electrical contact leads and said air vent means.

3. The pressure transducer of claim 1 wherein said sensing element comprises a magnetostrictive element.

4. The pressure transducer of claim 3 wherein said magnetostrictive element comprises a metalic coil having a pair of electrical contact leads extending from one end of said coil.

5. The pressure transducer of claim 4 further including a solenoidal winding arranged around a portion of said magnetostrictive coil for sensing variations in magnetic flux generated by said magnetostrictive coil and a pair of electrical contact leads extending from said solenoidal winding.

6. The pressure transducer of claim 5 wherein said coil leads and said solenoid leads exit through said base.

7. The pressure transducer of claim 6 further including a water-tight seal between said solenoid leads and said coil leads and said base for preventing liquid entrance within said housing.

8. The pressure transducer of claim 7 further including a water seal between said air vent means and said base for preventing the entrance of liquid to within said housing.

9. The pressure transducer of claim 1 wherein said air vent means comprises a vent tube connected at one end to said housing and exposed to the atmosphere at another end for providing atmospheric pressure within said housing.

10. The pressure transducer of claim 9 wherein said vent tube is selected from the group of materials consisting of plastic, rubber, and metal.

11. The pressure transducer of claim 10 further including a corresponding plurality of electrical contact leads for connecting with each of said solenoid and magnetostrictive coil contacts for providing electrical continuity between said magnetostrictive coil and said solenoid and the surface of said liquid.

12. The pressure transducer of claim 11 further including a cable housing for containing said magnetostrictive coil leads and said solenoid leads and said vent tube.

13. A pressure transducer supply cable comprising:
   electrical conducting means within a cable housing for providing electrical continuity between a pressure transducer mounted at one end of said cable and associated electrical equipment at an opposite end of said cable; and
   air vent means within said cable housing for providing atmospheric pressure to within said pressure transducer means, said air vent means comprises a vent tube coextensive with said cable and located within said cable housing.

14. The cable of claim 13 wherein said electrical contact means comprises at least one pair of insulated electrical wires for providing electrical power to said pressure transducer and at least one pair of insulated electrical wires for receiving electrical signals from said pressure transducer.

15. The pressure transducer cable of claim 13 wherein said insulated electrical wires are intermediate said cable housing and said vent tube.

16. The pressure transducer cable of claim 13 wherein said vent tube comprises the inner surface of said cable housing.

17. The pressure transducer cable of claim 13 wherein said air vent is selected from a group consisting of metal, plastic, and rubber.

18. The pressure transducer cable of claim 13 wherein said insulated electrical wires are concentric within said cable housing.

19. The pressure transducer cable of claim 13 wherein said electrical contact means and said air vent are attached to said pressure transducer by means of a water-tight seal.

* * * * *